M. BALBACH.
HEADER FOR GAS METERS.
APPLICATION FILED AUG. 14, 1911.

1,019,119.

Patented Mar. 5, 1912.

Witnesses

Inventor
M. Balbach,
By Watson E. Coleman
Attorney

UNITED STATES PATENT OFFICE.

MICHAEL BALBACH, OF WILKES-BARRE, PENNSYLVANIA.

HEADER FOR GAS-METERS.

1,019,119. Specification of Letters Patent. Patented Mar. 5, 1912.

Application filed August 14, 1911. Serial No. 643,881.

*To all whom it may concern:*

Be it known that I, MICHAEL BALBACH, a citizen of the United States, residing at Wilkes-Barre, in the county of Luzerne and State of Pennsylvania, have invented certain new and useful Improvements in Headers for Gas-Meters, of which the following is a specification, reference being had to the accompanying drawings.

This invention relates to a header for gas meters and has for its object to produce a device of this character whereby a series of gas meters may be connected, thereby eliminating the usual service pipe to each meter.

A further object of the invention is to construct a device of this type which may be readily attached to the usually constructed meter and is particularly adapted for use in buildings wherein a great many meters are required, such as apartment houses and office buildings.

Figure 1:
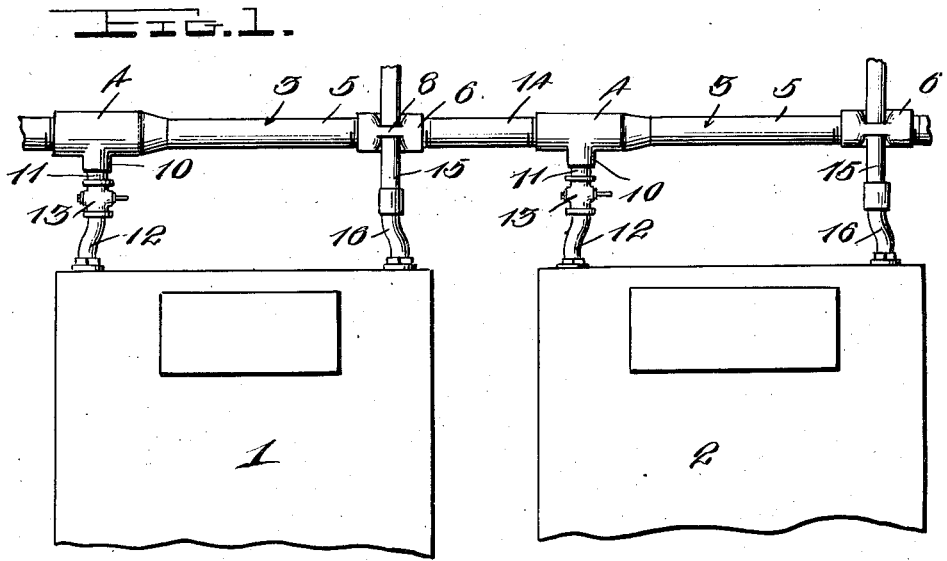
Figure 2:
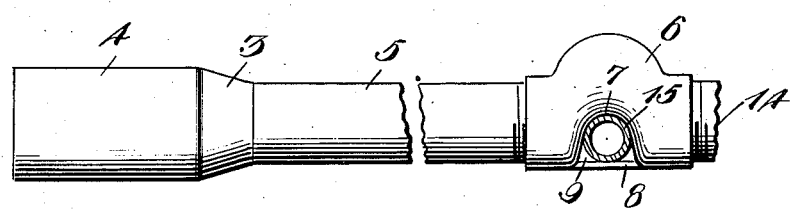
Figure 3:
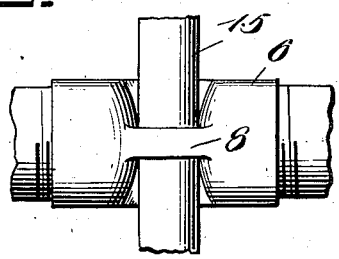

With the above and other objects in view, the invention resides in certain novel features of construction, combination and arrangement of parts, as will be more fully hereinafter described and illustrated in the accompanying drawings, in which, Figure 1 is a view showing the manner in which the headers are connected to a series of meters; Fig. 2 is a top plan view of the coupling which supports the pipe for supplying an apartment or office; Fig. 3 is a side elevation of the pipe supporting coupling somewhat enlarged.

Referring to the drawings, the numeral 1 and numeral 2 designate meters of the usual construction, it being, of course, understood that two or more meters may be connected by the improved device.

The header consists of a pipe 3, said pipe having an enlargement 4 formed at one end and in this enlargement the main or city supply is connected. The pipe 3 is also formed with a reduced portion 5, which is screw threaded at its extreme outer end and is adapted to be threaded into a coupling 6, said coupling being so formed as to produce a curved yoke 7, said yoke being inclosed by a bridge piece 8, said bridge piece being formed integral with the coupling 6 or being welded thereto, thus forming the pipe socket 9. The enlarged end 4 of the pipe 3 is formed with a downwardly extending extension 10, by which the gas from the main supply is passed through pipe sections 11 and 12, respectively.

Arranged between the pipe sections 11 and 12 is a valve 13, the same being for the purpose of turning on or cutting off the supply of gas to the meter 1. Threaded in the outer end of the coupling 6 is a short screw threaded pipe section 14 to which another header is connected, it being, of course, understood that each coupling 6 is provided with a similar connection for connecting as many meters as desired.

Supported within the socket 9 is a pipe 15, said pipe being connected at its lower end to a pipe connection 16, the same being similar to that usually employed upon meters. The pipe 15, by the peculiar formation of the coupling 6, is not only supported thereby but may be connected to the pipe 16 in direct alinement with the pipe sections 11 and 12, thus permitting the headers to be attached to meters of the usual construction. The pipe 15 permits the gas which has passed through the meter to be conducted to the proper apartment or offices.

From this construction it will be seen that the gas from the main supply will pass through the pipe sections 11 and 12 and through the registering mechanism of the meter and thence through the pipe 15 to the desired place of use. This construction also permits the gas to pass through the header 3 upon meter 1 to a second header upon meter 2.

It is obvious that the herein described header may be used in connection with meters of different sizes, and that the flow of gas may be from left to right or vice versa. The pipe sections 12 and 16 are swivelly connected to the meters in the usual manner, thus permitting the same to be adjusted for attachment to the headers.

Having thus described my invention, what I claim as new and desire to secure by Letters-Patent is:

1. A header for gas meters consisting of a pipe having one of its ends enlarged and its other end reduced, and a coupling secured to the reduced end, said coupling being provided with a yoke, and with a bridge piece inclosing said yoke whereby a pipe is supported.

2. A header for gas meters comprising a pair of pipe sections and a coupling to which said pipe sections are connected, said coupling being formed with a curved yoke and a bridge piece inclosing said yoke, whereby a socket is formed in one side of the yoke through which the gas outlet pipe may extend, the header being also provided with means for attaching a gas inlet pipe thereto.

3. In combination with a series of gas meters, each having the usual inlet and outlet connections, a series of detachably connected headers, each comprising a pair of pipes and a coupling to which said pipes are connected, said coupling being formed with a curved yoke and a bridge piece inclosing said yoke and forming a socket on one side of said coupling, each header having an enlarged portion at one end to receive one end of the next adjacent header, pipe sections connecting the said enlarged portions of the header to the inlet connections of the meters and outlet pipes attached to the outlet connections of the meters and extending through the sockets of the header couplings.

In testimony whereof I hereunto affix my signature in the presence of two witnesses.

MICHAEL BALBACH.

Witnesses:
 XAVIER YOUNGBLOOD,
 THOMAS J. LAKE.